T. W. BAILEY.
SAUSAGE STUFFER.
No. 8,834.
Patented Mar. 30, 1852.
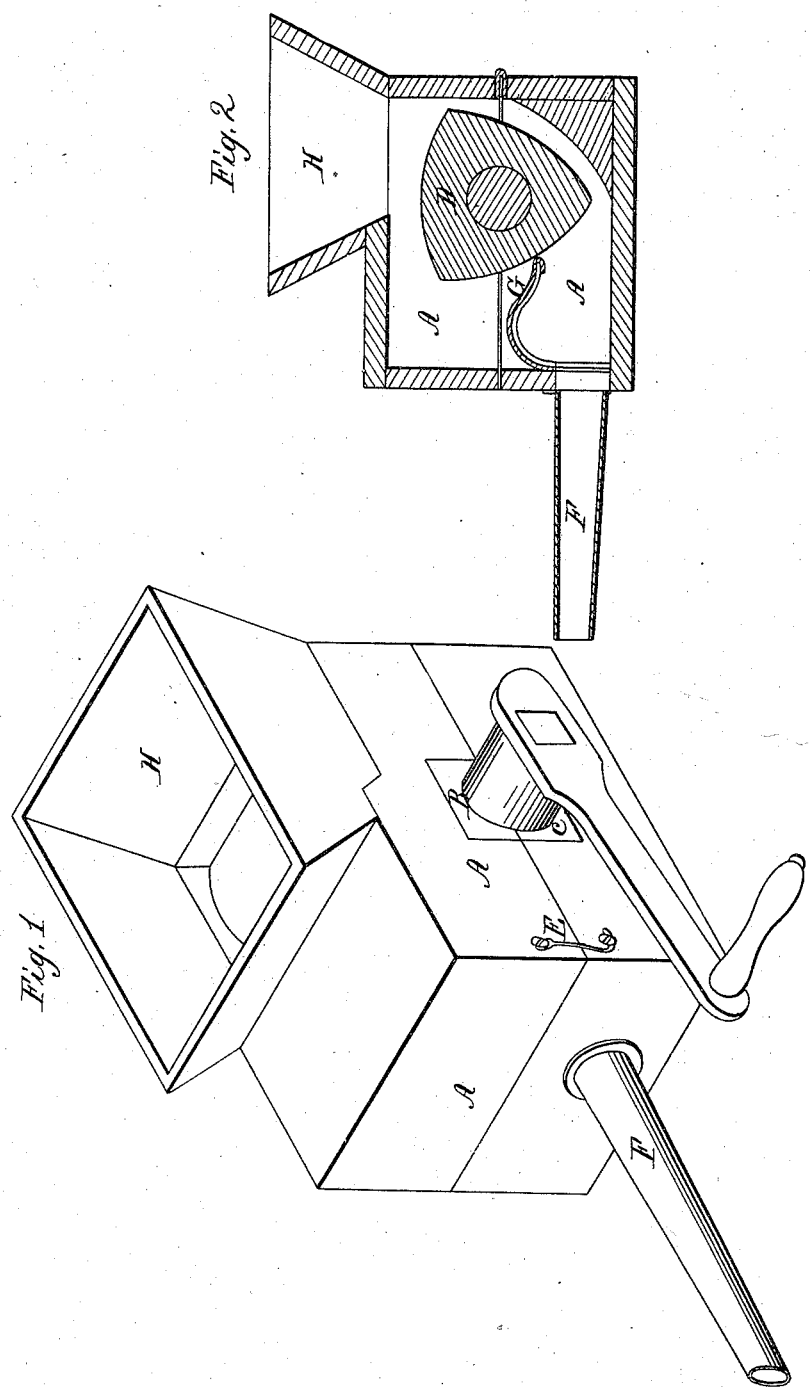

UNITED STATES PATENT OFFICE.

THOS. W. BAILEY, OF LEWISTOWN, PENNSYLVANIA.

SAUSAGE-STUFFER.

Specification of Letters Patent No. 8,834, dated March 30, 1852.

*To all whom it may concern:*

Be it known that I, THOMAS W. BAILEY, of Lewistown, in the county of Mifflin and State of Pennsylvania, have invented a new and useful Sausage-Stuffer; and I do hereby declare that the following is a full, clear, and exact description thereof, reference being had to the accompanying drawing, and letters marked thereon, forming a part of this specification, in which—

Figure 1 is an isometrical view, and Fig. 2, a longitudinal vertical section.

The nature of my improvement consists in constructing a simple, cheap, and efficient machine, by the use of a three cornered ovoid shaped cylinder combined with a spring scraper, said cylinder revolving horizontally inside of a case, in close contact with said scraper, both operating combinedly in such a manner as to draw the meat down from the hopper into the bottom of the case and force is under said spring scraper into the nozzle or stuffing tube with a steady pressure.

A, A, the case inclosing the cylinder and spring scraper, which I construct of any suitable strong material, and form it into two parts hinged together, so that it can be opened at any time for the purpose of cleaning it when necessary or to remove pieces of bone or foreign substances which may find their way into the case and obstruct the proper action of the machine. In the sides of the upper part of said case are set one half of the boxes one half of which is seen at B, in which the arbors of the cylinder D, revolve, and the other halves of the boxes, one half of which is seen at C, are set in the sides of the lower part of the case, so that when the case is closed by the hooks, one of which is seen at E, the boxes embrace the arbors of the shaft, forming proper bearings for the cylinder and a tight and strong case. The cylinder D, has its bearings not exactly in the center of the case but is so placed as to have more space in that end, where the nozzle or stuffing tube F is attached than in the other, which space is occupied with the curved spring scraper G. This spring scraper is firmly secured to the end of the case and answers the purpose of pressing against the cylinder D, so as to prevent the escape of the meat between it and the cylinder, which consequently must have the effect, as the cylinder rotates, to collect the meat in this end of the case, under the scraper, and force it through the nozzle or stuffing tube F, into the gut tied thereon with a uniform and continuous pressure.

H, the hopper into which the meat is introduced.

Thus a simple, cheap and efficient machine is constructed perfect in its action and not at all liable to get out of order, which advantages must recommend its general adoption in the place of those now in use.

Having thus fully described my improved sausage stuffer what I claim therein and desire to secure by Letters Patent is—

The combination of the three cornered ovoid shaped cylinder, with the curved spring scraper G, operating in the manner and for the purpose substantially as herein fully set forth.

In testimony whereof I have hereunto signed my name before two subscribing witnesses.

THOS. W. BAILEY.

Witnesses:
R. A. HALE,
HENRY STONER.